United States Patent
Liang et al.

(10) Patent No.: US 9,827,969 B2
(45) Date of Patent: Nov. 28, 2017

(54) CONTROLLING POWERTRAIN TORQUE IN A HYBRID VEHICLE

(71) Applicant: FORD GLOBAL TECHNOLOGIES, LLC, Dearborn, MI (US)

(72) Inventors: Wei Liang, Farmington Hills, MI (US); Xiaoyong Wang, Novi, MI (US); Mark Steven Yamazaki, Canton, MI (US); Rajit Johri, Ann Arbor, MI (US); Ryan Abraham McGee, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 511 days.

(21) Appl. No.: 14/103,882

(22) Filed: Dec. 12, 2013

(65) Prior Publication Data

US 2015/0165890 A1 Jun. 18, 2015

(51) Int. Cl.
| | | |
|---|---|---|
| *B60W 10/02* | (2006.01) | |
| *B60W 10/08* | (2006.01) | |
| *B60W 20/00* | (2016.01) | |
| *B60K 6/48* | (2007.10) | |

(Continued)

(52) U.S. Cl.
CPC ............ *B60W 10/023* (2013.01); *B60K 6/48* (2013.01); *B60W 10/02* (2013.01); *B60W 10/08* (2013.01); *B60W 20/10* (2013.01); *B60W 20/50* (2013.01); *B60W 2510/0275* (2013.01); *B60W 2510/082* (2013.01); *B60W 2710/086* (2013.01); *Y02T 10/6221* (2013.01); *Y10S 903/902* (2013.01); *Y10T 477/26* (2015.01)

(58) Field of Classification Search
CPC ... Y10T 477/755; B60W 6/42; B60W 10/023; B60W 20/50; B60W 20/02; B60W 20/08; B60W 20/10; Y10S 903/914
See application file for complete search history.

(56) References Cited

U.S. PATENT DOCUMENTS

| 6,226,585 B1 | 5/2001 | Cullen |
| 7,370,715 B2 * | 5/2008 | Colvin et al. ............. 180/65.28 |
| 7,846,065 B2 | 12/2010 | Chen |

(Continued)

OTHER PUBLICATIONS

Definition of term "acceleration"—Merriam-Webster.com, accessed Sep. 5, 2016.*

*Primary Examiner* — Jacob S Scott
*Assistant Examiner* — Tinh Dang
(74) *Attorney, Agent, or Firm* — David B. Kelley; Brooks Kushman P.C.

(57) ABSTRACT

A hybrid electric vehicle includes an engine and an electric machine, both capable of providing torque to transmission gearing. A clutch is disposed between the engine and the electric machine and is configured to selectively couple the engine to the electric machine. At times in which control of the amount of engine torque transmitted to the gearing is desirable, a controller is programmed to slip the clutch. If the controller is able to determine the amount of torque transmitted through the slipping clutch, the controller alters an output of the electric machine based upon the torque through the clutch. If, however, the controller is unable to determine the amount of torque transmitted through the slipping clutch, the controller alters the output of the electric machine based upon an acceleration of the electric machine.

15 Claims, 2 Drawing Sheets

(51) Int. Cl.
*B60W 20/10* (2016.01)
*B60W 20/50* (2016.01)

(56) References Cited

U.S. PATENT DOCUMENTS

| | | | |
|---|---|---|---|
| 7,899,600 B2 | 3/2011 | Thor | |
| 9,267,556 B2* | 2/2016 | Kim | F16D 48/066 |
| 9,308,807 B2* | 4/2016 | Hane | B60K 6/52 |
| 9,511,762 B2* | 12/2016 | Ooshima | B60K 6/48 |
| 9,517,763 B2* | 12/2016 | Zhu | B60W 20/30 |
| 9,573,586 B2* | 2/2017 | Matsui | B60W 20/40 |
| 2003/0098185 A1 | 5/2003 | Komeda et al. | |
| 2010/0108420 A1 | 5/2010 | Keiji | |
| 2012/0031201 A1* | 2/2012 | Sakuta | 73/862.08 |
| 2013/0211653 A1* | 8/2013 | Matsui et al. | 701/22 |
| 2013/0296113 A1* | 11/2013 | Nefcy et al. | 477/5 |

* cited by examiner

CONTROLLING POWERTRAIN TORQUE IN A HYBRID VEHICLE

TECHNICAL FIELD

The present disclosure relates to a torque control strategy of an electrically powered traction motor in a hybrid electric vehicle.

BACKGROUND

Hybrid electric vehicles include an internal combustion engine and a traction motor that are each individually capable of propelling the vehicle. One example of a hybrid vehicle includes a clutch between an engine and traction motor that share the same drive axis. The clutch selectively couples the engine to the traction motor such that one or both of the engine and traction motor can power a single transmission input.

SUMMARY

According to one embodiment, a vehicle comprises an engine, an electric machine configured to power wheels, transmission gearing, and a clutch configured to selectively couple the engine to the electric machine. At least one controller is programmed to slip the clutch to control an amount of engine torque transferred to the transmission gearing. While the clutch is slipping, the controller is programmed to alter an output of the electric machine based upon an acceleration of the electric machine while a clutch torque sensor fault condition is present. While the clutch torque sensor fault condition is absent, the controller is programmed to alter the output of the electric machine based upon a torque transmitted through the clutch.

According to another embodiment, a method for controlling a vehicle is provided. The vehicle has an electric machine coupled to an engine via a clutch. The method comprises slipping the clutch to control an amount of engine torque transferred to wheels of the vehicle. When a clutch torque sensor fault condition is present while the clutch is slipping, torque output of the electric machine is modified based upon a rate of change of speed of the electric machine. When the clutch torque sensor fault condition is absent, the torque output of the electric machine is modified based upon a torque transmitted through the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
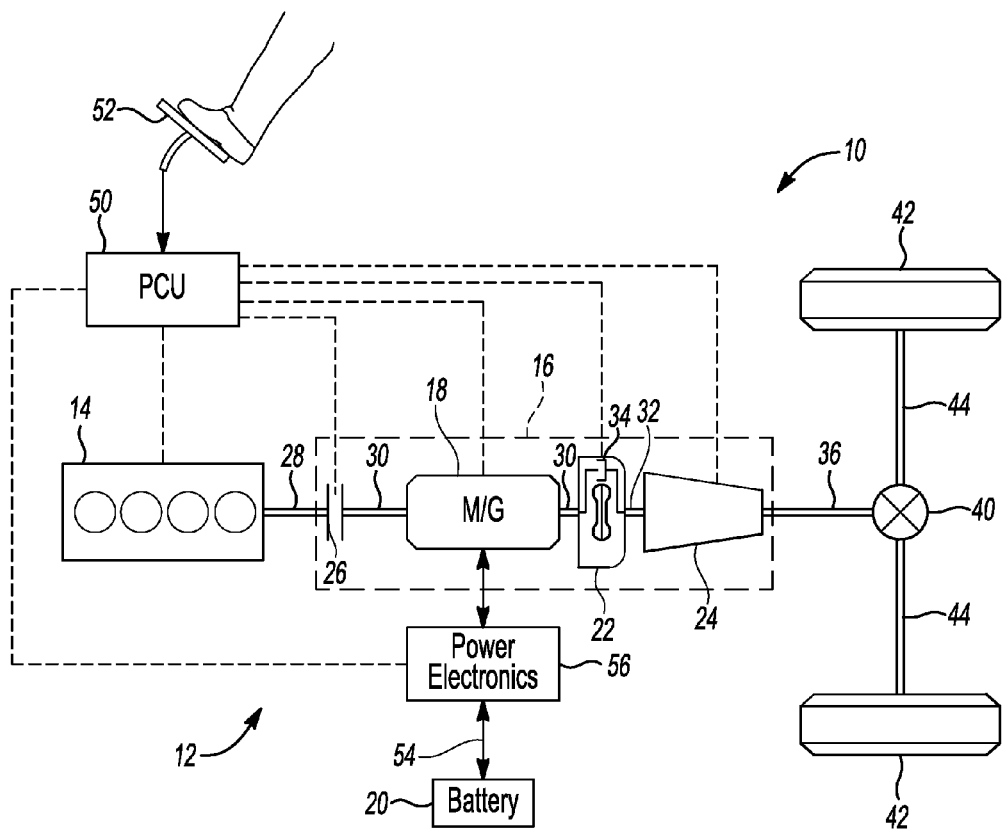
FIG. 1 is a schematic diagram of one exemplary hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor or motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

The disconnect clutch 26 can be engaged and disengaged by applying hydraulic pressure, for example. When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gearing or gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It may be desirable at times to maintain the power transmitted to the transmission at a relatively low magnitude to assure minimal torque is transmitted to the wheels of the vehicle. While the engine is on during these times, the traction motor can be controlled to regulate the total torque transmitted to the transmission in order to maintain the relatively low power input.

A hybrid vehicle such as the vehicle of FIG. 1 can run in a "powertrain speed control mode." During a powertrain speed control mode, the torque output of the M/G 18, or motor torque, is regulated and specifically controlled to maintain the input to gearing within the transmission gearbox 24. For example, the controller 50 can operate in the powertrain speed control mode in response to the vehicle being in Park or Neutral, the vehicle creeping at a relatively low speed, or the vehicle coasting. Park or Neutral gear can be determined by a gear selection (Park, Reverse, Neutral, Drive) sensor. Creeping can be indicated by an absence of accelerator pedal and brake pedal input while the vehicle travels at a low speed (e.g., less than 5 mph). Coasting can be indicated by a tip-out of the accelerator pedal 52. These situations are mere exemplary of when it may be desirable to maintain the input to the gearbox 24. In these situations, the vehicle can be characterized as operating in the powertrain speed control mode.

In these exemplary scenarios, when the engine is on, the output required by the engine 14 is relatively low. The amount of power transferred form the engine 14 can reduce during coasting, for example, when the engine 14 provides brake torque. The M/G 18 can be controlled to regulate the overall torque transmitted to the gearbox 24 by either providing additional torque to the gearbox 24 or by converting a portion of the power output by the engine 14 into electric energy to be stored in the battery 20.

In addition to the M/G 18 supplementing the power output from the engine 14, the controller 50 can also command the disconnect clutch 26 to slip, or be only partially engaged. When the disconnect clutch 26 is slipping, the rotational speed of shaft 28 differs from the rotational speed of shaft 30. This consequently translates into less than the full amount of torque provided by the engine 14 transmitting downstream of the disconnect clutch 26. Thus slipping the disconnect clutch 26 can also regulate and control the amount of power input to the gearbox 24 from the engine. Slipping the disconnect clutch 26 can be particularly useful while the vehicle is operating in the powertrain speed control mode in order to limit the amount of engine power transmitted to the wheels 42.

When the clutch is slipping during the powertrain speed control mode, the dynamics that govern the power output of the M/G 18 can be represented by Equation (1) below:

$$J_m \dot{\omega}_m = \tau_{clt} + \tau_m + \tau_{tc} \quad (1)$$

where $J_m$ is the M/G inertia, $\omega_m$ is the M/G speed, $\tau_{clt}$ is the clutch torque of the disconnect clutch 26, $\tau_m$ is the motor torque of the M/G 18, and $\tau_{tc}$ is the loss across the torque converter 22.

The clutch torque $\tau_{clt}$ represents the amount of torque across the disconnect clutch 26 applied to the M/G 18. The amount of clutch torque transferred to the M/G 18 depends on the status of the clutch 26 (i.e., whether the clutch is locked or slipping). If the clutch 26 is locked, the clutch torque capacity is high enough such that the transferred clutch torque is equal to the amount of torque transferred from the engine 14, as represented by Equation (2) below:

$$\tau_{clt} = \tau_e - J_e \dot{\omega}_e \quad (2)$$

where $\tau_e$ is the torque output of the engine 14, $J_e$ is the inertia of the engine, and $\omega_e$ is the rotational speed of the engine or crankshaft 28. Alternatively, if the clutch 26 is slipping, the clutch torque is equal to the clutch torque capacity, which is a function of the slip of the clutch 26 and the hydraulic pressure applied to the clutch 26, as represented by Equation (3) below:

$$\tau_{clt} = f(\lambda, p) \quad (3)$$

where $\lambda$ is the amount of slip in the clutch, and $p$ is the amount of hydraulic pressure applied to the clutch 26.

The controller 50 utilizes both the clutch torque as well as the M/G speed to produce a commanded torque output of the M/G 18. This commanded torque output of the M/G 18 regulates the final torque sent to the torque converter 22 (if provided and not bypassed via bypass clutch 34) and to the input of the gearbox 24 during the powertrain speed control mode.

Figure 2:
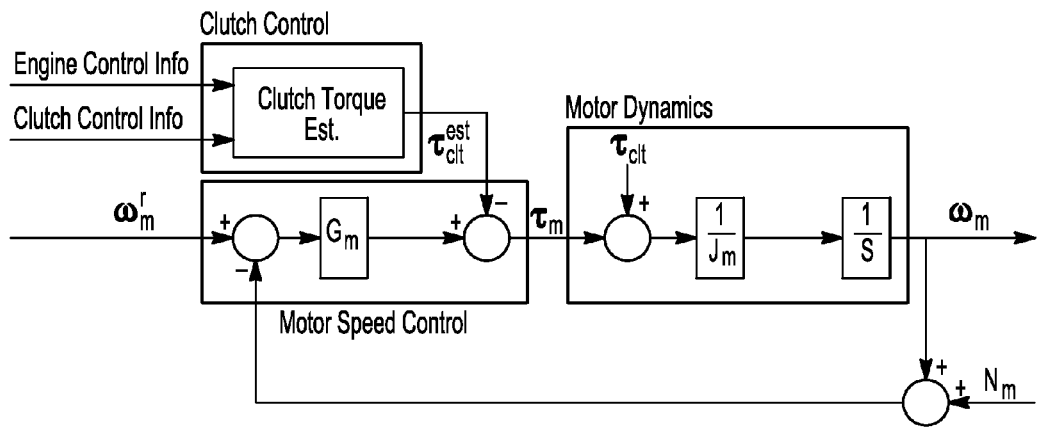
FIG. 2 is a diagram illustrating operation of a system for controlling an output of an electric motor utilizing an estimated clutch torque of an engine disconnect clutch.

Referring to FIG. 2, such a control strategy of the M/G 18 during powertrain speed control mode is illustrated in additional detail. The speed control loop of the M/G 18 comprises a clutch control, a motor speed control, and motor dynamics. A feedback mechanism is implemented to filter disturbances and remove any motor speed tracking errors.

As shown in FIG. 2, the output speed of the M/G 18 is controlled during the powertrain speed control mode by the motor torque and the clutch torque. The motor torque is based on an estimated clutch torque (shown as the clutch control) and a motor speed control. The Laplace complex frequency domain (or s-domain) transfer function of the motor speed control of FIG. 2 can be represented by Equation (4) below:

$$\tau_m(s) = \tau_{clt}^{est}(s) + G_m(s)(\omega_m^r(s) - \omega_m(s)) \quad (4)$$

where $\tau_{clt}^{est}$ is an estimated clutch torque across disconnect clutch 26, $G_m(s)$ is the transfer function in s-domain of a feedback control algorithm of speed, and $\omega_m^r$ is the motor speed command.

In utilizing an algorithm incorporating Equation (4), it is important that the estimated clutch torque $\tau_{clt}^{est}$ is accurate. The estimated clutch torque can be determined by measuring the amount of hydraulic pressure applied to the clutch 26, the amount of slip in the clutch 26, and/or the relative speeds of rods 28, 30 across the clutch 26, for example. Sensors that determine the slip, pressure, and speeds must therefore be accurate in order to provide an accurate estimated clutch torque. Furthermore, communication between various controllers should be without much delay, and the signal conditions should not be poor (e.g., should not have large amounts of noise, etc.).

If any of the above-referenced signals, sensors, communications, and other inputs that are used to measuring the estimated clutch torque are disturbed or inaccurate, "a clutch torque sensor fault condition" is present. One example of a clutch torque sensor fault condition is if there is a loss or disturbance in the hydraulic pressure signal for the disconnect clutch 26. This would inhibit an effective determination of the estimated clutch torque. Another example is if the detected rotational speeds of portions of the clutch are operating outside predefined ranges of values or normal operating conditions. These are merely examples of clutch torque sensor fault conditions; it should be understood that the clutch torque sensor fault condition refers to any fault in the vehicle that leads to an inaccurate or ineffective determination of the torque transmitted through the clutch 26.

According to embodiments of the present disclosure, a control algorithm that can achieve similar motor speed control performance during the presence of a clutch torque sensor fault condition is provided without the need to estimate clutch torque.

Figure 3:
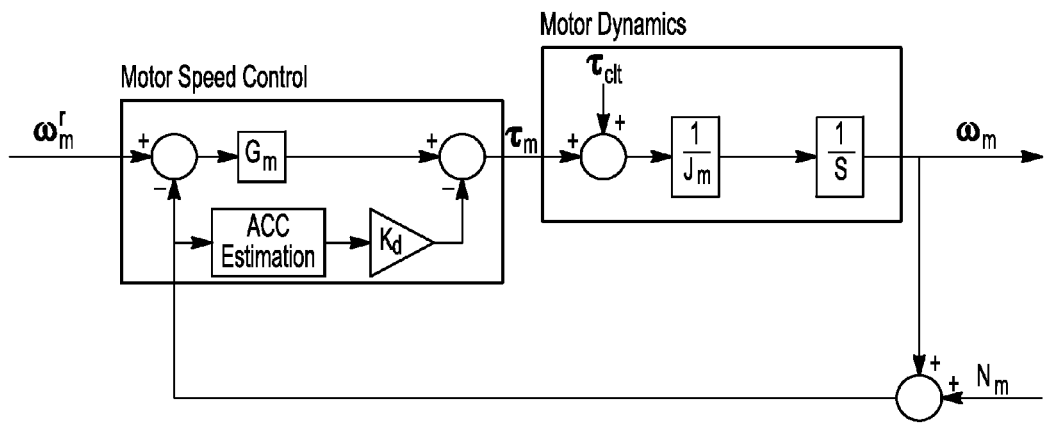
FIG. 3 is a diagram illustrating operation of a system for controlling output of an electric motor utilizing the speed and/or acceleration of the electric motor when estimated clutch torque determination is unavailable.

FIG. 3 illustrates a control strategy that provides a speed command $\omega_m$ to the M/G 18 based on measurements of the M/G 18 itself, rather than an estimate torque across the disconnect clutch 26. In particular, the clutch torque estimation of FIG. 2 has been removed. In place of the clutch control is a transfer function that calculates the motor speed change based on the motor speed measurement. In other words, a change of speed or acceleration of the M/G 18 ("ACC Estimation") is provided in the motor speed control such that the desired motor speed output is calculated based on speed measurements of the motor. An exemplary algorithm for a determined motor torque $\tau_m$ utilizing the motor speed control of FIG. 3 is provided below in Equation (5):

$$\tau_m(s) = K_d G_c(s)(\omega_m^r(s) - \omega_m(s)) + G_m(s)(\omega_m^r(s) - \omega_m(s)) \quad (5)$$

where $K_d$ is a derivative coefficient and $G_c(s)$ is an acceleration calculation of the motor, or M/G 18. Using this motor speed control algorithm, if the motor speed deviates from the commanded motor speed due to an input of torque from the engine 14, the algorithm modifies the motor torque in either direction to control the overall torque input to the transmission gearbox 24. For example, if brake torque is provided from the engine 14, the M/G 18 can output torque in an opposite direction of the brake torque in order to counteract the brake torque and control the overall torque sent to the transmission gearbox 24.

When measuring the instantaneous speed of the motor 18 ($\omega_m$) in order to determine the acceleration of the motor, it may be necessary to first filter the speed of the motor. Passing the speed readings of the motor through filters can reduce the noise in the speed measurements to smoothen the commanded torque of the motor. For example, a low-pass filter may be used to remove the high frequency content from the speed measurement. The filtered, smoothened signal can then be differentiated to determine the acceleration of the motor. In another example, a fast low pass filter can filter the motor speed signals. One or both of the unfiltered speed signal and the filtered speed signal can then pass through a slow low pass filter. The double-filtered signal and the single-filtered signal can be taken as the estimate of the acceleration of the motor speed. In yet another example, the motor speed signals can pass through a lead filter to accomplish both filtering and derivation of the speed signals to arrive at a smoothened motor acceleration.

As described above, the determined acceleration of the M/G 18, or motor, enables the controller to command the motor based on the speed readings of the motor itself In use, the vehicle may enter a powertrain speed control mode in which the vehicle is in Park, Neutral, is coasting, or is creeping. If the engine is on, the output of the engine 14 is reduced to a relatively low output. Engine braking may occur that provides a negative torque through the powertrain 12. The amount of clutch torque would normally dictate the amount of motor torque commanded. However, in the event that a clutch torque sensor fault condition is present, the controller 50 is unable to properly determine the amount of torque transmitted from the engine 14 through the disconnect clutch 26. Because of the inability to properly determine the clutch torque, the commanded motor torque of the M/G 18 would be hindered if it were based upon the clutch torque. A control strategy using a speed signal of the motor itself is therefore utilized, eliminating the need to use the clutch torque as an input to the commanded motor torque. One such example of using the motor acceleration to control the motor torque during the powertrain speed control mode is exemplified by Equation (5) above.

In the absence of any clutch torque sensor fault condition, it may be preferable to indeed utilize the estimated clutch torque to control the motor torque, as represented by example in Equation (4) above. Because no faults exist in the ability to arrive at an estimated clutch torque, the amount of torque transferred from the engine 14 can be more precisely inferred. However, when a clutch torque sensor fault condition is indeed present, it may be preferable to instead utilize the motor acceleration in order to control the motor torque, as represented by example in Equation (5) above. This would allow the acceleration of the motor (rather than the clutch torque) to govern the commanded output of the M/G 18.

Figure 4:
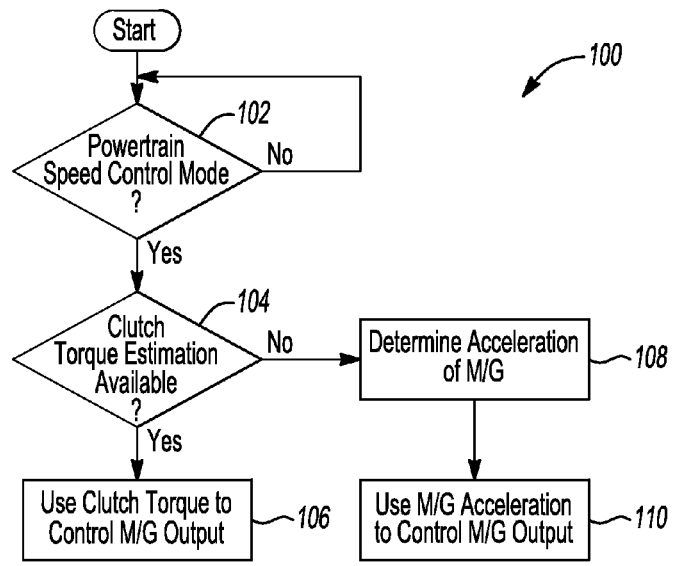
FIG. 4 is a flowchart illustrating operation of an algorithm for controlling the output of the electric machine.

FIG. 4 illustrates one embodiment of an algorithm 100 implemented by controller 50 to govern the output of the M/G 18 using the control strategies outlined above. At 102, the controller determines whether the vehicle is operating in a powertrain speed control mode. As explained above, the powertrain speed control mode can be when the input to the transmission gearbox 24 is controlled to a desired speed during, for example, creeping, coasting, or when the vehicle is in Park or Neutral. If the vehicle is operating in the powertrain speed control mode, then the controller determines whether clutch torque estimation is available at 104. If there are no clutch torque sensor fault conditions that would inhibit the ability to estimate the torque across the disconnect clutch 26, then clutch torque estimation is available.

If clutch torque estimation is indeed available, the algorithm proceeds to 106 at which the controller utilizes the estimated clutch torque to control the output of the M/G 18 using Equation (4), for example. However, if the clutch torque estimation is not available due to a clutch torque sensor fault condition, the controller determines the acceleration of the M/G 18 at 108. This can be done by obtaining a derivation of a filtered speed of the M/G 18, as previously described. With the speed and acceleration of the M/G 18 known, at 110 the controller can control the output of the M/G 18 based on the speed and acceleration of the M/G 18 using Equation (5), for example.

Throughout utilization of the algorithm 100 during the powertrain speed control mode of operation, the algorithm 100 can continuously check for the availability of an accurate clutch torque estimation due to an absence of any clutch torque sensor fault conditions. When the clutch torque sensor fault conditions are removed or otherwise absent, the controller can proceed to step 106 such that the clutch torque estimation is used to control the output of the M/G 18. This allows the controller to more effectively control the M/G 18 based on the torque through the clutch 26 when determination of the clutch torque is available. However, whenever the determination of the clutch torque is unavailable due to a presence of a clutch torque sensor fault condition, the controller will control the M/G 18 based on the acceleration of the M/G 18.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine;
an electric machine configured to power wheels of the vehicle;
a clutch configured to selectively couple the engine to the electric machine;
transmission gearing; and
at least one controller programmed to (i) slip the clutch to reduce an amount of engine torque transferred from the engine to the gearing and (ii) modify torque output by the electric machine based upon an acceleration of the electric machine.

2. The vehicle of claim 1, wherein the at least one controller is further programmed to modify the torque output based upon a torque through the clutch.

3. The vehicle of claim 2, wherein the at least one controller is further programmed to modify the torque output based upon the acceleration in a presence of a clutch torque sensor fault condition and to modify the torque output based upon the torque through the clutch in an absence of the torque sensor fault condition.

4. The vehicle of claim 3, wherein the clutch torque sensor fault condition occurs when the torque through the clutch falls outside a predefined range of values.

5. The vehicle of claim 1, wherein the acceleration is indicative of the torque through the clutch.

6. The vehicle of claim 1, wherein the acceleration is based on a difference between an actual and a filtered speed of the electric machine.

7. The vehicle of claim 1, wherein an output of the engine, an output of the electric machine, and an input to the gearing are coaxial.

8. A vehicle comprising:
an engine;
an electric machine configured to power wheels;
a clutch configured to selectively couple the engine to the electric machine; and
at least one controller programmed to (i) slip the clutch to control engine torque transmitted to the wheels, (ii) alter an output of the electric machine based upon an acceleration of the electric machine while a clutch torque sensor fault condition is present, and (iii) alter the output of the electric machine based upon a torque through the clutch while the torque sensor fault condition is absent.

9. The vehicle of claim 8, wherein the clutch torque sensor fault condition occurs when the at least one controller is unable to detect a torque through the clutch.

10. The vehicle of claim 8, wherein the clutch torque sensor fault condition occurs when the torque through the clutch falls outside a predefined range of values.

11. The vehicle of claim 8, wherein the acceleration is based upon a difference between an actual and filtered speed of the electric machine.

12. The vehicle of claim 8, wherein the acceleration is indicative of the torque through the clutch.

13. A method for controlling a vehicle having an electric machine coupled to an engine via a clutch, the method comprising:
slipping the clutch to control an amount of engine torque transferred to wheels; and
when a clutch torque sensor fault condition is present while the clutch is slipping, modifying a torque output of the electric machine based upon a rate of change of speed of the electric machine.

14. The method of claim 13 further comprising, when the clutch torque sensor fault condition is absent, modifying the torque output based upon a torque through the clutch.

15. The method of claim 13, wherein the clutch torque sensor fault condition occurs when the torque through the clutch falls outside a predefined range of values.

* * * * *